US012756504B2

(12) United States Patent
Park et al.

(10) Patent No.: US 12,756,504 B2
(45) Date of Patent: Oct. 6, 2026

(54) METHOD AND DEVICE FOR SUPPORTING SIDELINK DRX ON BASIS OF MODE 1 CG RESOURCE IN NR V2X

(71) Applicant: LG ELECTRONICS INC., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 557 days.

(21) Appl. No.: 18/035,168

(22) PCT Filed: Nov. 5, 2021

(86) PCT No.: PCT/KR2021/015984
§ 371 (c)(1),
(2) Date: May 3, 2023

(87) PCT Pub. No.: WO2022/098138
PCT Pub. Date: May 12, 2022

(65) Prior Publication Data

US 2024/0014948 A1 Jan. 11, 2024

(30) Foreign Application Priority Data

Nov. 5, 2020 (KR) ........................ 10-2020-0146780
Nov. 30, 2020 (KR) ........................ 10-2020-0163819

(51) Int. Cl.
*H04W 72/04* (2023.01)
*H04L 1/1829* (2023.01)
(Continued)

(52) U.S. Cl.
CPC ........... *H04L 1/1854* (2013.01); *H04W 76/28* (2018.02); *H04W 92/18* (2013.01)

(58) Field of Classification Search
CPC ... H04L 1/1854; H04L 1/1822; H04L 1/1864; H04L 1/188; H04L 1/1887; H04L 1/1896;
(Continued)

(56) References Cited

U.S. PATENT DOCUMENTS

2013/0301421 A1* 11/2013 Yi ..................... H04W 52/0216 370/241
2017/0099581 A1* 4/2017 Yang ..................... H04W 8/005
(Continued)

FOREIGN PATENT DOCUMENTS

WO 2020130755 6/2020
WO WO-2021243600 A1 * 12/2021 ............ H04W 76/23

OTHER PUBLICATIONS

Huawei, "Discussion on remaining MAC open issues for 5G V2X with NR SL," R2-2003555, 3GPP TSG-RAN WG2 Meeting #109-bis electronic, Apr. 20-30, 2020.
(Continued)

*Primary Examiner* — Mahbubul Bar Chowdhury
(74) *Attorney, Agent, or Firm* — BRYAN CAVE LEIGHTON PAISNER LLP

(57) ABSTRACT

An embodiment proposes a method for performing wireless communication by a first device. The method may comprise a step of receiving information related to a configured grant (CG) from a base station, the information related to the CG including information related to a hybrid automatic repeat request (HARQ) process ID for the CG, and period information of a resource related to the CG, and transmitting a first transport block to a second device at a first period on the basis of the period information and a first HARQ process ID. For example, on the basis that transmission of the first
(Continued)

transport block fails, and the first HARQ process ID and a second HARQ process ID are the same, a discontinuous reception (DRX) timer related to the first transport block may be stopped at a second period related to the second HARQ process ID. For example, DRX related to the first transport block may include DRX between the first device and the base station and DRX between the first device and the second device.

19 Claims, 19 Drawing Sheets

(51) Int. Cl.
*H04W 76/28* (2018.01)
*H04W 92/18* (2009.01)

(58) Field of Classification Search
CPC .... H04L 1/1812; H04L 1/1848; H04W 76/28; H04W 92/18; H04W 52/0235; H04W 52/0248; H04W 52/0216; H04W 52/0225; H04W 72/115; H04W 72/40; H04W 72/25; H04W 4/40; Y02D 30/70
See application file for complete search history.

(56) References Cited

U.S. PATENT DOCUMENTS

| | | | | |
|---|---|---|---|---|
| 2020/0275474 | A1 | 8/2020 | Chen et al. | |
| 2020/0313808 | A1 | 10/2020 | Lee et al. | |
| 2021/0084650 | A1* | 3/2021 | Fan | H04L 5/0098 |
| 2021/0105096 | A1* | 4/2021 | Chin | H04L 1/1887 |
| 2021/0105126 | A1* | 4/2021 | Yi | H04W 76/27 |
| 2021/0227517 | A1* | 7/2021 | Yi | H04W 72/23 |
| 2021/0227602 | A1* | 7/2021 | Li | H04W 76/28 |
| 2022/0094484 | A1* | 3/2022 | Babaei | H04W 72/1263 |
| 2022/0116987 | A1* | 4/2022 | Chin | H04W 72/1268 |
| 2022/0217749 | A1* | 7/2022 | Yu | H04W 72/20 |
| 2025/0267738 | A1* | 8/2025 | Mochizuki | H04W 76/14 |

OTHER PUBLICATIONS

LG Electronics Inc., "Summary of MAC open issues for NR sidelink," R2-2003757, 3GPP TSG-RAN WG2 #109-e, Apr. 20-30, 2020.

Huawei, "Discussion on remaining MAC open issues for 5G V2X with NR SL," R2-2005492, 3GPP TSG-RAN WG2 Meeting #110-electronic, Jun. 1-12, 2020.

* cited by examiner

FIG. 13
receive first transport block from first device in first period
S1310

1000(102/106, 202/206)

METHOD AND DEVICE FOR SUPPORTING SIDELINK DRX ON BASIS OF MODE 1 CG RESOURCE IN NR V2X

CROSS-REFERENCE TO RELATED APPLICATIONS

This application is the National Stage filing under 35 U.S.C. 371 of International Application No. PCT/KR2021/015984 filed on Nov. 5, 2021, which claims the benefit of Korean Patent Application No. 10-2020-0146780 filed on Nov. 5, 2020, and Korean Patent Application No. 10-2020-0163819 filed on Nov. 30, 2020, which are all hereby incorporated by reference herein in their entirety.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, in sidelink communication, a power saving operation of a user equipment (UE) (e.g., a pedestrian UE) may be supported. For example, after passing a set of periods for configured grant (CG) resources allocated from a base station to the UE, a collision may occur between a hybrid automatic repeat request (HARQ) process ID mapped to a CG resource and a HARQ process ID mapped to a dynamic grant (DG) resource for retransmission.

In this case, for example, a retransmission transport block (TB) may be flushed from a HARQ buffer (i.e., the HARQ buffer mapped to the HARQ process ID in which the collision occurs). In this case, it is necessary to define how the UE should perform a discontinuous (DRX) timer operation.

Based on an embodiment of the present disclosure, a method for performing wireless communication by a first device may be provided. The method may comprise: receiving, from a base station, information related to configured grant (CG), the information related to the CG including information related to a hybrid automatic repeat request (HARQ) process ID for the CG and period information of resources related to the CG; and transmitting, to a second device, a first transport block in a first period, based on the period information and the first HARQ process ID. For example, based on that the transmission of the first transport block is failed and the first HARQ process ID is same as a second HARQ process ID, a discontinuous reception (DRX) timer related to the first transport block may be stopped in a second period related to the second HARQ process ID. For example, DRX related to the first transport block may include DRX between the first device and the base station and DRX between the first device and the second device.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a base station, information related to configured grant (CG), the information related to the CG including information related to a hybrid automatic repeat request (HARQ) process ID for the CG and period information of resources related to the CG; and transmit, to a second device, a first transport block in a first period, based on the period information and the first HARQ process ID. For example, based on that the transmission of the first transport block is failed and the first HARQ process ID is same as a second HARQ process ID, a discontinuous reception (DRX) timer related to the first transport block may be stopped in a second period related to the second HARQ process ID. For example, DRX related to the first transport block may include DRX between the first device and the base station and DRX between the first device and the second device.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: receive, from a base station, information related to configured grant (CG), the information related to the CG including information related to a hybrid automatic repeat request (HARQ) process ID for the CG and period information of resources related to the CG; and transmit, to a second UE, a first transport block in a first period, based on the period information and the first HARQ process ID. For example, based on that the transmission of the first transport block is failed and the first HARQ process ID is same as a second HARQ process ID, a discontinuous reception (DRX) timer related to the first transport block may be stopped in a second period related to the second HARQ process ID. For example, DRX related to the first transport block may include DRX between the first UE and the base station and DRX between the first UE and the second UE.

Based on an embodiment of the present disclosure, a non-transitory computer-readable storage medium storing instructions may be provided. For example, the instructions, when executed, may cause a first device to: receive, from a base station, information related to configured grant (CG), the information related to the CG including information related to a hybrid automatic repeat request (HARQ) process ID for the CG and period information of resources related to the CG; and transmit, to a second device, a first transport block in a first period, based on the period information and the first HARQ process ID. For example, based on that the transmission of the first transport block is failed and the first HARQ process ID is same as a second HARQ process ID, a discontinuous reception (DRX) timer related to the first transport block may be stopped in a second period related to the second HARQ process ID. For example, DRX related to the first transport block may include DRX between the first device and the base station and DRX between the first device and the second device.

Based on an embodiment of the present disclosure, a method for performing wireless communication by a second device may be provided. The method may comprise: receiving, from a first device, a first transport block in a first period. For example, information related to configured grant (CG) may be received by the first device from a base station. For example, the information related to the CG may include information related to a hybrid automatic repeat request (HARQ) process ID for the CG and period information of resources related to the CG. For example, based on the period information and a first HARQ process ID, the first transport block may be received in the first period. For example, based on that transmission of the first transport block is failed and the first HARQ process ID is same as a second HARQ process ID, a discontinuous reception (DRX) timer related to the first transport block may be stopped in a second period related to the second HARQ process ID. For example, DRX related to the first transport block may include DRX between the first device and the base station and DRX between the first device and the second device.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, a first transport block in a first period. For example, information related to configured grant (CG) may be received by the first device from a base station. For example, the information related to the CG may include information related to a hybrid automatic repeat request (HARQ) process ID for the CG and period information of resources related to the CG. For example, based on the period information and a first HARQ process ID, the first transport block may be received in the first period. For example, based on that transmission of the first transport block is failed and the first HARQ process ID is same as a second HARQ process ID, a discontinuous reception (DRX) timer related to the first transport block may be stopped in a second period related to the second HARQ process ID. For example, DRX related to the first transport block may include DRX between the first device and the base station and DRX between the first device and the second device.

If a hybrid automatic repeat request (HARQ) process ID related to a retransmission transport block (TB) and a HARQ process ID assigned for new TB transmission are the same, the UE can obtain a power saving gain by stopping a discontinuous reception (DRX) timer related to the retransmission TB.

DETAILED DESCRIPTION

Figure 1:
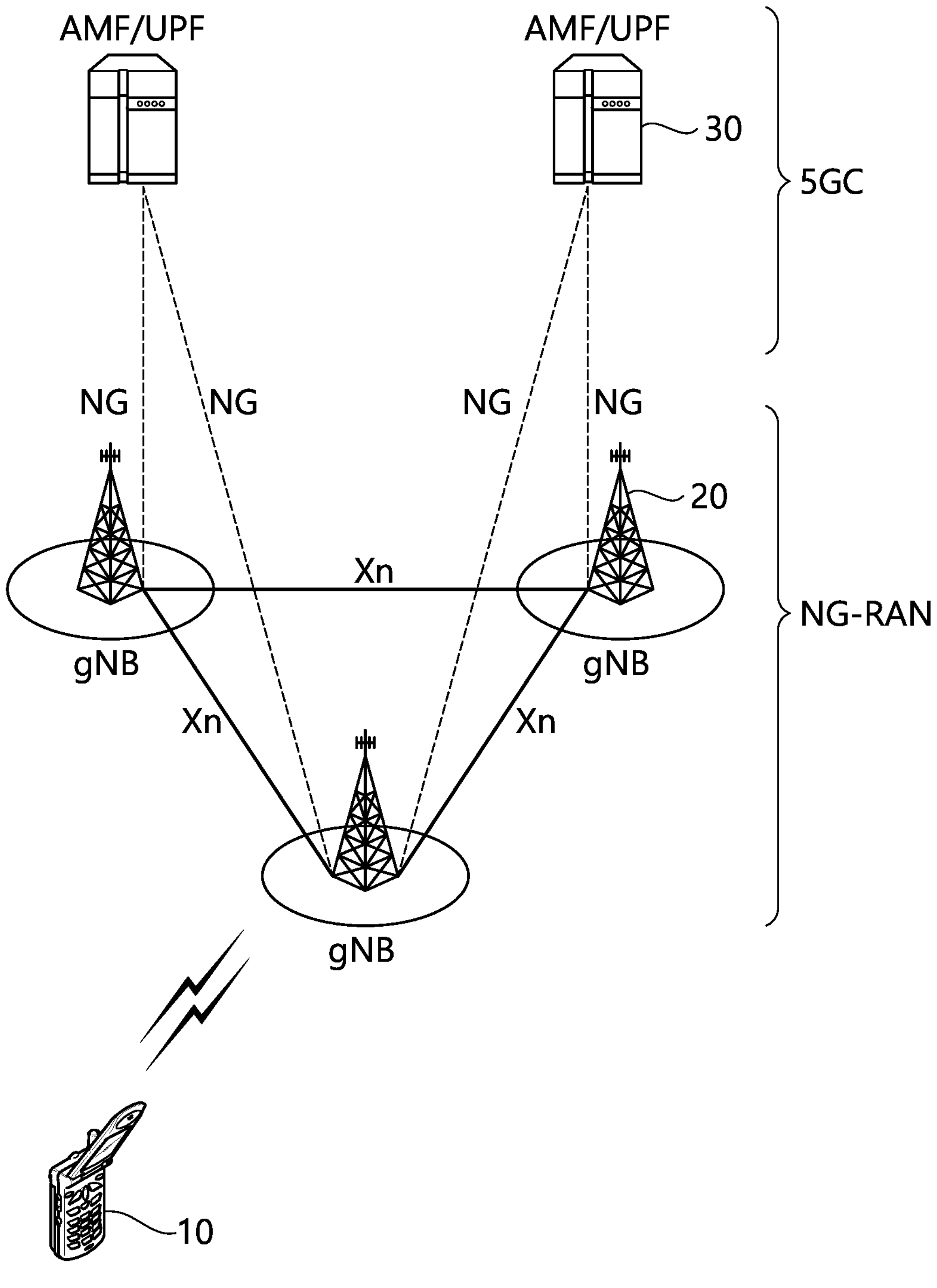
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the documents in Table 1 below may be referred to.

TABLE 1

| 3GPP LTE | 3GPP NR (e.g. 5G) |
|---|---|
| 3GPP TS 36.211: Physical channels and modulation | 3GPP TS 38.211: Physical channels and modulation |
| 3GPP TS 36.212: Multiplexing and channel coding | 3GPP TS 38.212: Multiplexing and channel coding |
| 3GPP TS 36.213: Physical layer procedures | 3GPP TS 38.213: Physical layer procedures for control |
| 3GPP TS 36.214: Physical layer; Measurements | 3GPP TS 38.214: Physical layer procedures for data |
| 3GPP TS 36.300: Overall description | 3GPP TS 38.215: Physical layer measurements |
| 3GPP TS 36.304: User Equipment (UE) procedures in idle mode | 3GPP TS 38.300; Overall description |
| 3GPP TS 36.314: Layer 2 - Measurements | 3GPP TS 38.304: User Equipment (UE) procedures in idle mode and in RRC inactive state |
| 3GPP TS 36.321: Medium Access Control (MAC) protocol | 3GPP TS 38.321: Medium Access Control (MAC) protocol |
| 3GPP TS 36.322: Radio Link Control (RLC) protocol | 3GPP TS 38.322: Radio Link Control (RLC) protocol |
| 3GPP TS 36.323: Packet Data Convergence Protocol (PDCP) | 3GPP TS 38.323: Packet Data Convergence Protocol (PDCP) |
| 3GPP TS 36.331: Radio Resource Control (RRC) protocol | 3GPP TS 38.331: Radio Resource Control (RRC) protocol |
| | 3GPP TS 37.324: Service Data Adaptation Protocol (SDAP) |
| | 3GPP TS 37.340: Multi-connectivity; Overall description |

FIG. 1 shows a structure of an NR system, based on an embodiment of the present disclosure. The embodiment of FIG. 1 may be combined with various embodiments of the present disclosure.

Referring to FIG. 1, a next generation—radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
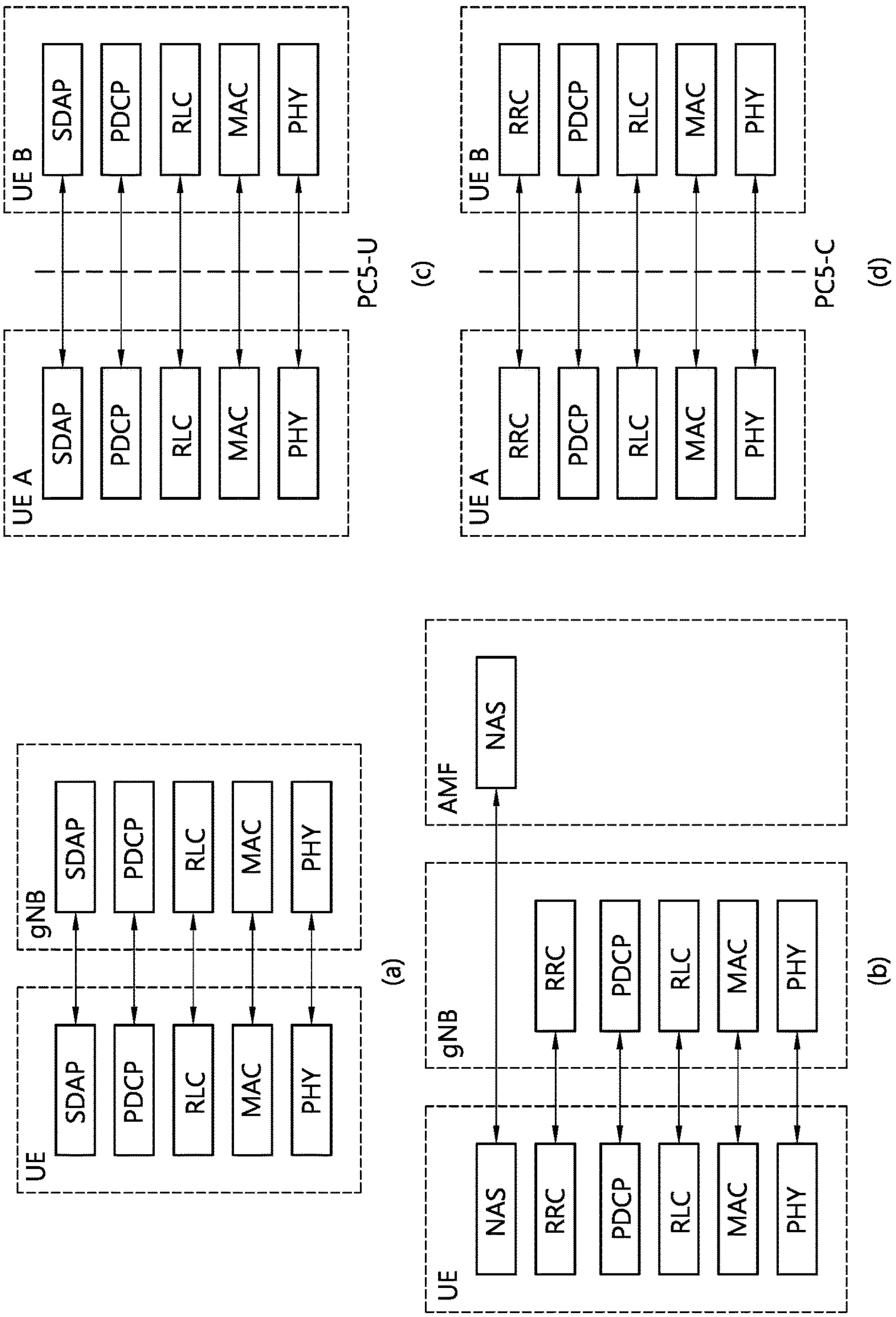
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
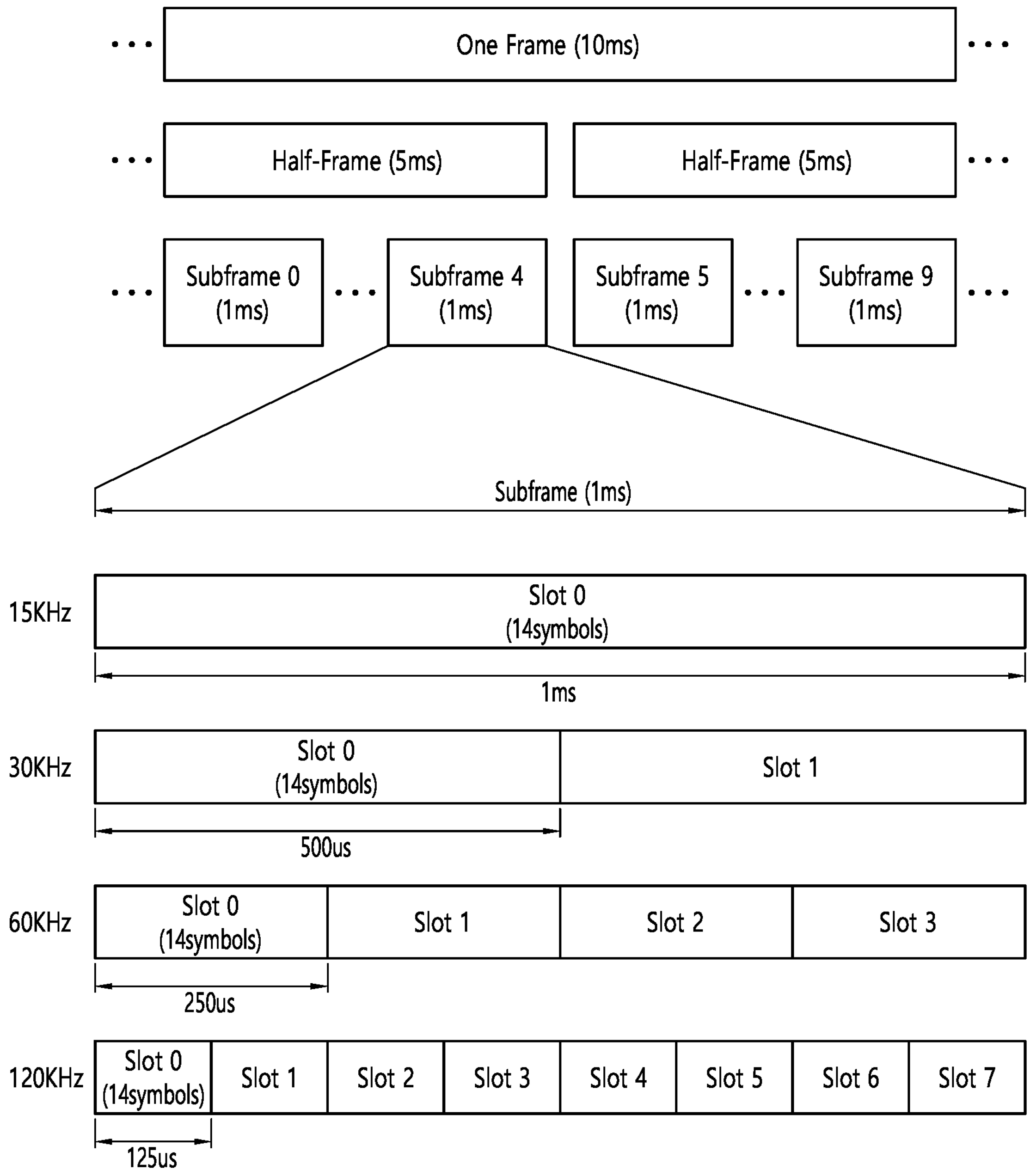
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 2 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 2-continued

| SCS ($15*2^u$) | $N^{slot}_{symb}$ | $N^{frame,u}_{slot}$ | $N^{subframe,u}_{slot}$ |
|---|---|---|---|
| 120 KHz (u = 3) | 14 | 80 | 8 |
| 240 KHz (u = 4) | 14 | 160 | 16 |

Table 3 shows an example of a number of symbols per slot, a number of slots per frame, and a number of slots per subframe based on the SCS, in a case where an extended CP is used.

TABLE 3

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz 52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 5

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
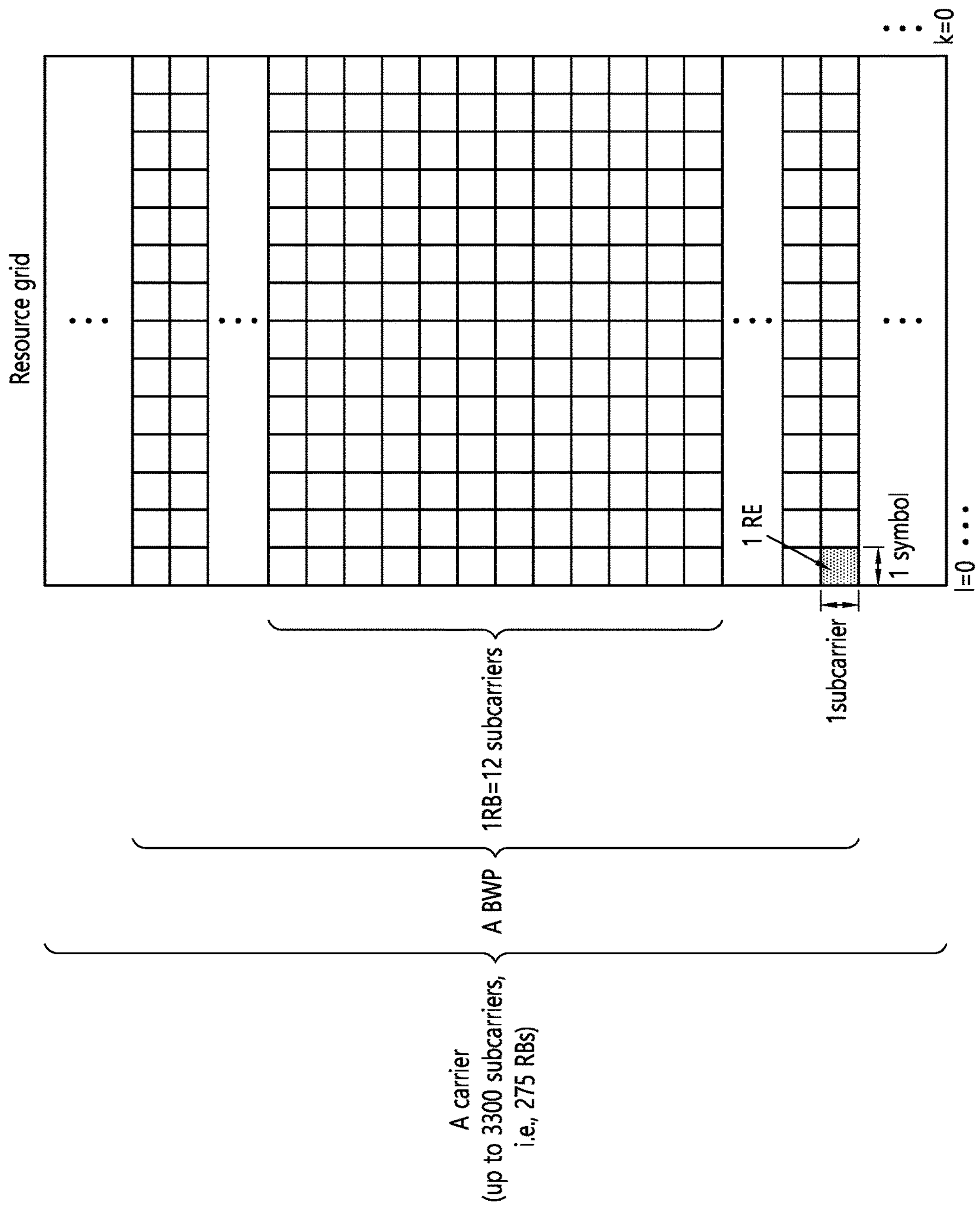
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P) RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
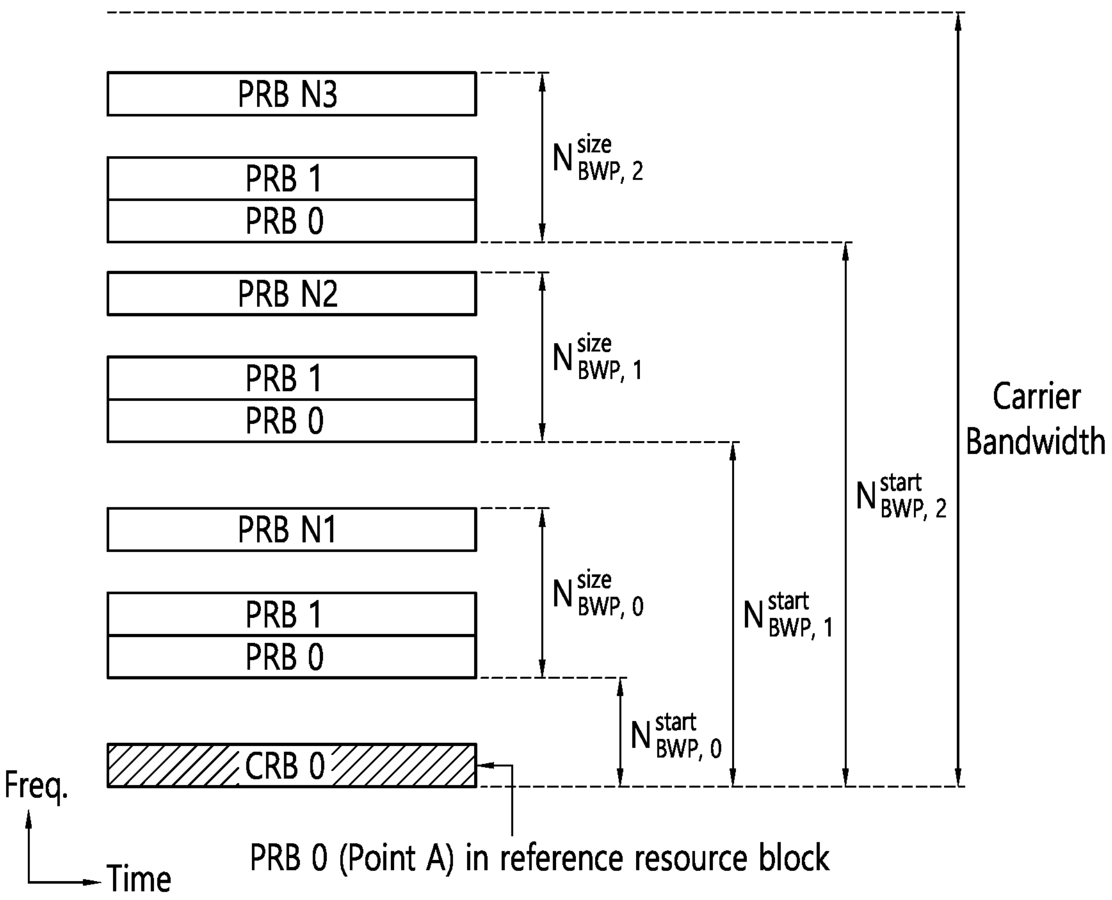
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
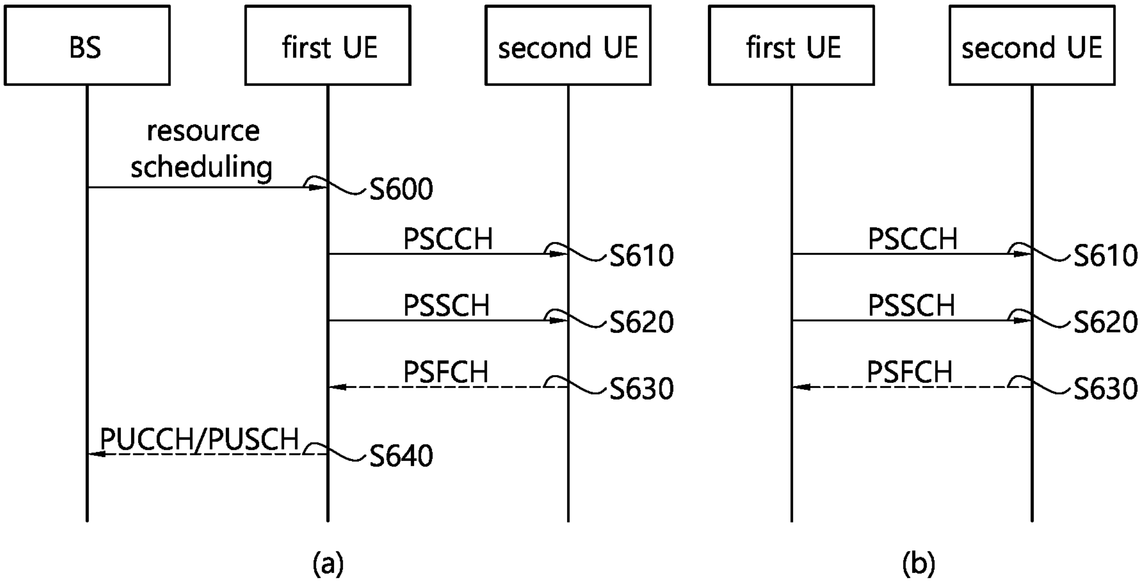
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 6 shows an example of a DCI for SL scheduling.

TABLE 6

| 7.3.1.4.1 Format 3_0 |
|---|
| DCI format 3_0 is used for scheduling of NR PSCCH and NR PSSCH in one cell.<br>The following information is transmitted by means of the DCI format 3_0 with CRC scrambled by SL-RNTI or SL-CS-RNTI:<br>Resource pool index - $\lceil \log_2 I \rceil$ bits, where I is the number of resource pools for transmission configured by the higher layer parameter sl-TxPoolScheduling.<br>Time gap - 3 bits determined by higher layer parameter sl-DCI-ToSL-Trans, as defined in clause 8.1.2.1 of [6, TS 38.214]<br>HARQ process number - 4 bits as defined in clause 16.4 of [5, TS 38.213]<br>New data indicator - 1 bit as defined in clause 16.4 of [5, TS 38.213]<br>Lowest index of the subchannel allocation to the initial transmission - $\lceil \log_2(N^{SL}_{subChannel}) \rceil$ bits as defined in clause 8.1.2.2 of [6, TS 38.214]<br>SCI format 1-A fields according to clause 8.3.1.1:<br>Frequency resource assignment.<br>Time resource assignment.<br>PSFCH-to-HARQ feedback timing indicator - $\lceil \log_2 N_{fb\_timing} \rceil$ bits, where $N_{fb\_timing}$ is the number of entries in the higher layer parameter sl-PSFCH-ToPUCCH, as defined in clause 16.5 of [5, TS 38.213]<br>PUCCH resource indicator - 3 bits as defined in clause 16.5 of [5, TS 38.213].<br>Configuration index - 0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.<br>Counter sidelink assignment index - 2 bits<br>2 bits as defined in clause 16.5.2 of [5, TS 38.213] if the UE is configured with pdsch-HARQ-ACK-Codebook = dynamic |

TABLE 6-continued

| 7.3.1.4.1 Format 3_0 |
|---|
| 2 bits as defined in clause 16.5.1 of [5, TS 38.213] if the UE is configured with pdsch-HARQ-ACK-Codebook = semi-static<br>Padding bits, if required |

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a Pt SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B. Tables 7A-7B show an example of the $1^{st}$-stage SCI format.

TABLE 7A

| 3GPP TS 38.212 |
|---|
| 8.3.1.1 SCI format 1-A |
| SCI format 1-A is used for the scheduling of PSSCH and $2^{nd}$-stage-SCI on PSSCH<br>The following information is transmitted by means of the SCI format 1-A:<br>Priority - 3 bits as specified in clause 5.4.3.3 of [12, TS 23.287] and clause 5.22.1.3.1 of [8, TS 38.321].<br>Frequency resource assignment - $\left\lceil \log_2\left(\frac{N^{SL}_{subChannel}(N^{SL}_{subChannel}+1)}{2}\right)\right\rceil$ bits<br>when the value of the higher layer parameter sl-MaxNumPerReserve is configured to 2; otherwise<br>$\left\lceil \log_2\left(\frac{N^{SL}_{subChannel}(N^{SL}_{subChannel}+1)(2N^{SL}_{subChannel}+1)}{6}\right)\right\rceil$ bits<br>when the value of the higher layer parameter sl-MaxNumPerReserve is configured to 3, as defined in clause 8.1.2.2 of [6, TS 38.214].<br>Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214]. |

TABLE 7A-continued

| 3GPP TS 38.212 |
| --- |
| Resource reservation period -⌈ $\log_2 N_{rsv\_period}$⌉bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.<br>DMRS pattern - ⌈$\log_2 N_{pattern}$⌉ bits as defined in clause 8.4.1.1.2 of [4, TS 38.211], where $N_{pattern}$ is the number of DMRS patterns configured by higher layer parameter sl-PSSCH-DMRS-TimePatternList.<br>$2^{nd}$-stage SCI format - 2 bits as defined in Table 7B.<br>Beta_offset indicator - 2 bits as provided by higher layer parameter sl-BetaOffsets2ndSCI and Table 8.3.1.1-2.<br>Number of DMRS port - 1 bit as defined in Table 8.3.1.1-3.<br>Modulation and coding scheme - 5 bits as defined in clause 8.1.3 of [6, TS 38.214].<br>Additional MCS table indicator - as defined in clause 8.1.3.1 of [6, TS 38.214]: 1 bit if one MCS table<br>is configured by higher layer parameter sl-Additional-MCS-Table; 2 bits if two MCS tables are configured by higher layer parameter sl- Additional-MCS-Table; 0 bit otherwise.<br>PSFCH overhead indication - 1 bit as defined clause 8.1.3.2 of [6, TS 38.214] if higher layer parameter sl-PSFCH-Period = 2 or 4; 0 bit otherwise.<br>Reserved - a number of bits as determined by higher layer parameter sl-NumReservedBits, with value set to zero. |

TABLE 7B

| $2^{nd}$-stage SCI formats | |
| --- | --- |
| Value of 2nd-stage SCI format field | 2nd-stage SCI format |
| 00 | SCI format 2-A |
| 01 | SCI format 2-B |

TABLE 7B-continued

| $2^{nd}$-stage SCI formats | |
| --- | --- |
| Value of 2nd-stage SCI format field | 2nd-stage SCI format |
| 10 | Reserved |
| 11 | Reserved |

Tables 8A-8B show an example of the $2^{nd}$-stage SCI format.

TABLE 8A

| 3GPP TS 38.212 |
| --- |
| 8.4.1.1 SCI format 2-A<br>SCI format 2-A is used for the decoding of PSSCH, with HARQ operation when HARQ-ACK information includes ACK or NACK, when HARQ-ACK information includes only NACK, or when there is no feedback of HARQ-ACK information.<br>The following information is transmitted by means of the SCI format 2-A:<br>HARQ process number - 4 bits as defined in clause 16.4 of [5, TS 38.213].<br>New data indicator - 1 bit as defined in clause 16.4 of [5, TS 38.213].<br>Redundancy version - 2 bits as defined in clause 16.4 of [6, TS 38.214].<br>Source ID - 8 bits as defined in clause 8.1 of [6, TS 38.214].<br>Destination ID - 16 bits as defined in clause 8.1 of [6, TS 38.214].<br>HARQ feedback enabled/disabled indicator - 1 bit as defined in clause 16.3 of [5, TS 38.213].<br>Cast type indicator - 2 bits as defined in Table 8B.<br>CSI request - 1 bit as defined in clause 8.2.1 of [6, TS 38.214].<br>8.4.1.2 SCI format 2-B<br>SCI format 2-B is used for the decoding of PSSCH, with HARQ operation when HARQ-ACK information includes only NACK, or when there is no feedback of HARQ-ACK information.<br>The following information is transmitted by means of the SCI format 2-B:<br>HARQ process number - 4 bits as defined in clause 16.4 of [5, TS 38.213].<br>New data indicator - 1 bit as defined in clause 16.4 of [5, TS 38.213].<br>Redundancy version - 2 bits as defined in clause 16.4 of [6, TS 38.214].<br>Source ID - 8 bits as defined in clause 8.1 of [6, TS 38.214].<br>Destination ID - 16 bits as defined in clause 8.1 of [6, TS 38.214].<br>HARQ feedback enabled/disabled indicator - 1 bit as defined in clause 16.3 of [5, TS 38.213].<br>Zone ID - 12 bits as defined in clause 5.8.11 of [9, TS 38.331].<br>Communication range requirement - 4 bits determined by higher layer parameter sl-ZoneConfigMCR-Index. |

TABLE 8B

| Cast type indicator | |
|---|---|
| Value of Cast type indicator | Cast type |
| 00 | Broadcast |
| 01 | Groupcast when HARQ-ACK information includes ACK or NACK |
| 10 | Unicast |
| 11 | Groupcast when HARQ-ACK information includes only NACK |

Referring to (a) or (b) of FIG. 6, in step S630, the first UE may receive the PSFCH based on Table 9 and Table 10. For example, the first UE and the second UE may determine a PSFCH resource based on Table 9 and Tables 10A-10D, and the second UE may transmit HARQ feedback to the first UE using the PSFCH resource.

TABLE 9

| 16.3 UE procedure for reporting HARQ-ACK on sidelink |
|---|
| A UE can be indicated by an SCI format scheduling a PSSCH reception, in one or more sub-channels from a number of $N_{subch}^{PSSCH}$ sub-channels, to trasmit a PSFCH with HARQ-ACK information in response to the PSSCH reception. The UE provides HARQ-ACK information that includes ACK or NACK, or only NACK. |
| A UE can be provided, by sl-PSFCH-Period-r16, a number of slots in a resource pool for a period of PSFCH transmission occasion resources. If the number is zero, PSFCH transmissions from the UE in the resource pool are disabled. |
| A UE expects that a slot $t_k'^{SL}$ $(0 \le k < T'_{max})$ has a PSFCH transmission occasion resource if k mod $N_{PSSCH}^{PSFCH} = 0$, where $t_k'^{SL}$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period-r16. |
| A UE may be indicated by higher layers to not transmit a PSFCH in response to a PSSCH reception [11, TS 38.321]. |
| If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception. |
| A UE is provided by sl−PSFCH−RB−Set−r16 a set of $M_{PRB,set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the $[(i + j \cdot N_{PSSCH}^{PSFCH}) \cdot M_{subch,slot}^{PSFCH}, (i + 1 + j \cdot N_{PSSCH}^{PSFCH}) \cdot M_{subch,slot}^{PSFCH} - 1]$ PRBs from the $M_{PRB,set}^{PSFCH}$ PRBs to slot i among the PSSCH slots associated with the PSFCH slot and sub-channel j, where $M_{subch,slot}^{PSFCH} = M_{PRB,set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j. The UE expects that $M_{PRB,set}^{PSFCH}$ is a multiple of $N_{subch} \cdot N_{PSSCH}^{PSFCH}$. |
| A UE determines a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ where $N_{CS}^{PSFCH}$ is a number of cyclic shift pairs for the resource pool and, based on an indication by higher layers, |

TABLE 9-continued

| 16.3 UE procedure for reporting HARQ-ACK on sidelink |
|---|
| $N_{type}^{PSFCH} = 1$ and the $M_{subch,slot}^{PSFCH}$ PRBs are associated with the starting sub-channel of the corresponding PSSCH |
| $N_{type}^{PSFCH} = N_{subch}^{PSSCH}$ and the $N_{subch}^{PSSCH} \cdot M_{subch,slot}^{PSFCH}$ PRBs are associated with one or more sub-channels from the $N_{subch}^{PSSCH}$ sub-channels of the corresponding PSSCH |

TABLE 10A

| |
|---|
| The PSFCH resources are first indexed according to an ascending order of the PRB index, from the $N_{type}^{PSFCH} \cdot M_{subch,slot}^{PSFCH}$ PRBs, and then according to an ascending order of the cyclic shift pair index from the $N_{CS}^{PSFCH}$ cyclic shift pairs. |
| A UE determines an index of a PSFCH resource for a PSFCH transmission in response to a PSSCH reception as $(P_{ID} + M_{ID}) \bmod R_{PRB,CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero. |
| A UE determines a mo value, for computing a value of cyclic shift a [4, TS 38.211], from a cyclic shift pair index corresponding to a PSFCH resource index and from $N_{CS}^{PSFCH}$ using Table 10B. |
| A UE determines a mcs value, for computing a value of cyclic shift a [4, TS 38.211], as in Table 10C if the UE detects a SCI format 2-A with Cast type indicator field value of "01" or "10", or as in Table 10D if the UE detects a SCI format 2-B or a SCI format 2-A with Cast type indicator field value of "11". The UE applies one cyclic shift from a cyclic shift pair to a sequence used for the PSFCH transmission [4, TS 38.211]. |

TABLE 10B

Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | 1 |
| 2 | 0 | 3 | — | — | — | — |
| 3 | 0 | 2 | 4 | — | — | — |
| 6 | 0 | 1 | 2 | 3 | 4 | 5 |

TABLE 10C

Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

TABLE 10D

Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to (a) of FIG. 6, in step S640, the first UE may transmit SL HARQ feedback to the base station through the PUCCH and/or the PUSCH based on Tables 11 and 12A-12B.

TABLE 11

| |
|---|
| 16.5 UE procedure for reporting HARQ-ACK on uplink |
| A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in Clause 9, of the cell where the UE monitors PDCCH for detection of DCI format 3_0. |
| For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources. |
| For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0. |

TABLE 11-continued

| |
|---|
| For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable |
| if the UE receives a PSFCH associated with a SCI format 2-A with Cast type indicator field value of "10" |
| generate HARQ-ACK information with same value as a value of HARQ-ACK information the UE determines from a PSFCH reception in the PSFCH reception occasion and, if the UE determines that a PSFCH is not received at the PSFCH reception occasion, generate NACK |
| if the UE receives a PSFCH associated with a SCI format 2-A with Cast type indicator field value of "01" |
| generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in Clause 16.3; otherwise, generate NACK |
| if the UE receives a PSFCH associated with a SCI format 2-B or a SCI format 2-A with Cast type indicator field value of "11" |
| generate ACK when the UE determines absence of PSFCH reception for each PSFCH reception occasion from the number of PSFCH reception occasions; otherwise, generate NACK |
| After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information. |
| The UE generates a NACK when, due to prioritization, as described in Clause 16.2.4, the UE does not receive PSFCH in any PSFCH reception occasion associated with a PSSCH transmission in a resource provided by a DCI format 3_0 with CRC scrambled by a SL-RNTI or, for a configured grant, in a resource provided in a single period and for which the UE is provided a PUCCH resource to report HARQ-ACK information. The priority value of the NACK is same as the priority value of the PSSCH transmission. |
| The UE generates a NACK when, due to prioritization as described in Clause 16.2.4, the UE does not transmit a PSSCH in any of the resources provided by a DCI format 3_0 with CRC scrambled by SL-RNTI or, for a configured grant, in any of the resources provided in a single period and for which the UE is provided a PUCCH resource to report HARQ-ACK information. The priority value of the NACK is same as the priority value of the PSSCH that was not transmitted due to prioritization. |
| The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant. |

TABLE 12A

| |
|---|
| A UE does not expect to be provided PUCCH resources or PUSCH resources to report HARQ-ACK information that start earlier than $(N + 1) \cdot (2048 + 144) \cdot \kappa \cdot 2^{\mu} \cdot T_c$ after the end of a last symbol of a last PSFCH reception occasion, from a number of PSFCH reception occasions that the UE generates HARQ-ACK information to report in a PUCCH or PUSCH transmission, where |
| $\kappa$ and $T_c$ are defined in [4, TS 38.211] |
| $\mu = \min(\mu_{SL}, \mu_{UL})$, where $\mu_{SL}$ is the SCS configuration of the SL BWP and $\mu_{UL}$ is the SCS configuration of the active UL BWP on the primary cell |
| N is determined from $\mu$ according to Table 12B |
| With reference to slots for PUCCH transmissions and for a number of PSFCH reception occasions ending in slot n, the UE provides the generated HARQ-ACK information in a PUCCH transmission within slot n + k, subject to the overlapping conditions in Clause 9.2.5, where k is a number of slots indicated by a PSFCH-to-HARQ_feedback timing indicator field, if present, in a DCI format indicating a slot for PUCCH transmission to report the HARQ-ACK information, or k is provided by sl-PSFCH-ToPUCCH-CG-Typel-r16. k = 0 corresponds to a last slot for a PUCCH transmission that would overlap with the last PSFCH reception occasion |
| assuming that the start of the sidelink frame is same as the start of the downlink frame [4, TS 38.211]. |
| For a PSSCH transmission by a UE that is scheduled by a DCI format, or for a SL configured grant Type 2 PSSCH transmission activated by a DCI format, the DCI format indicates to the UE that a PUCCH resource is not provided when a value of the PUCCH resource indicator field is zero and a value of PSFCH-to-HARQ feedback timing indicator field, if present, is zero. For a SL configured grant Type 1 PSSCH transmission, a PUCCH resource can be provided by sl-NIPUCCH-AN-r16 and sl-PSFCH-ToPUCCH-CG-Type1-r16. If a PUCCH resource is not provided, the UE does not transmit a PUCCH with generated HARQ-ACK information from PSFCH reception occasions. |
| For a PUCCH transmission with HARQ-ACK information, a UE determines a PUCCH resource after determining a set of PUCCH resources for $O_{UCI}$ HARQ-ACK information bits, as described in Clause 9.2.1. The PUCCH resource determination is based on a PUCCH resource indicator field [5, TS 38.212] in a last DCI format 3_0, among the DCI formats 3_0 that have a value of a PSFCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are indexed in an ascending order across PDCCH monitoring occasion indexes. |
| A UE does not expect to multiplex HARQ-ACK information for more than one SL configured grants in a same PUCCH. |
| A priority value of a PUCCH transmission with one or more sidelink HARQ-ACK information bits is the smallest priority value for the one or more HARQ-ACK information bits. |
| In the following, the CRC for DCI format 3_0 is scrambled with a SL-RNTI or a SL-CS-RNTI. |

TABLE 12B

| Values of N | |
|---|---|
| μ | N |
| 0 | 14 |
| 1 | 18 |
| 2 | 28 |
| 3 | 32 |

Figure 7:
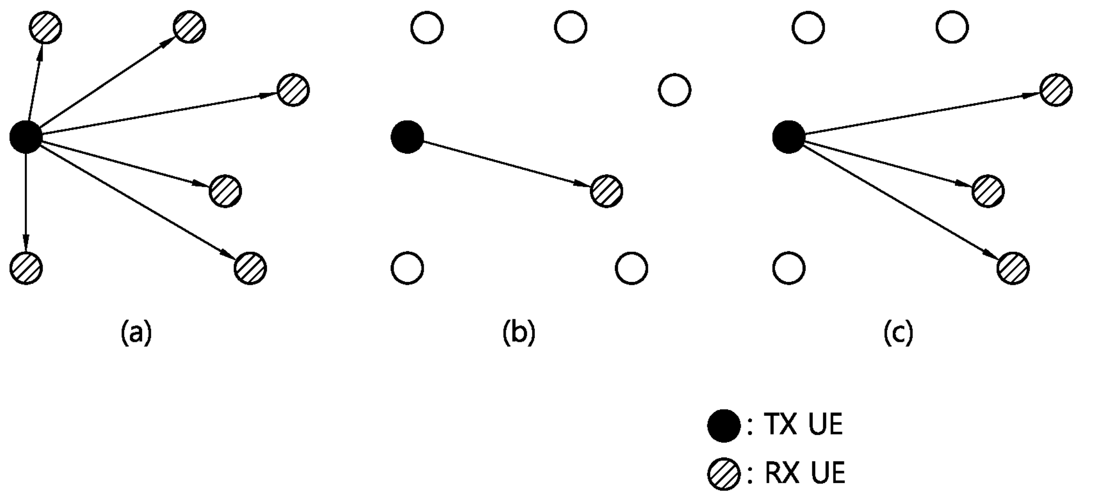
FIG. 7 shows three cast types, based on an embodiment of the present disclosure.
Figure 8:
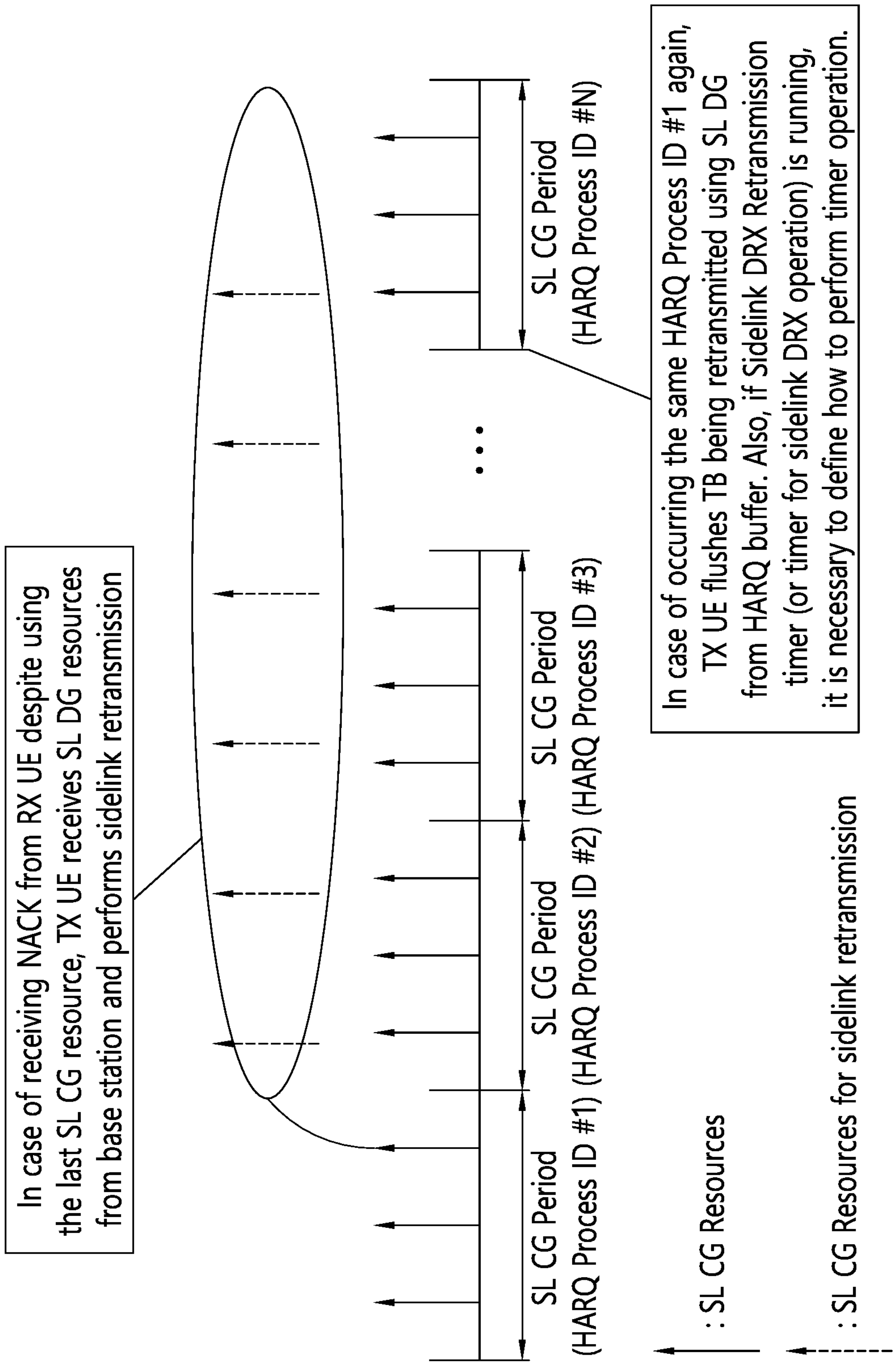
FIG. 8 shows an example of a collision between HARQ process IDs, based on an embodiment of the present disclosure.
Figure 9:
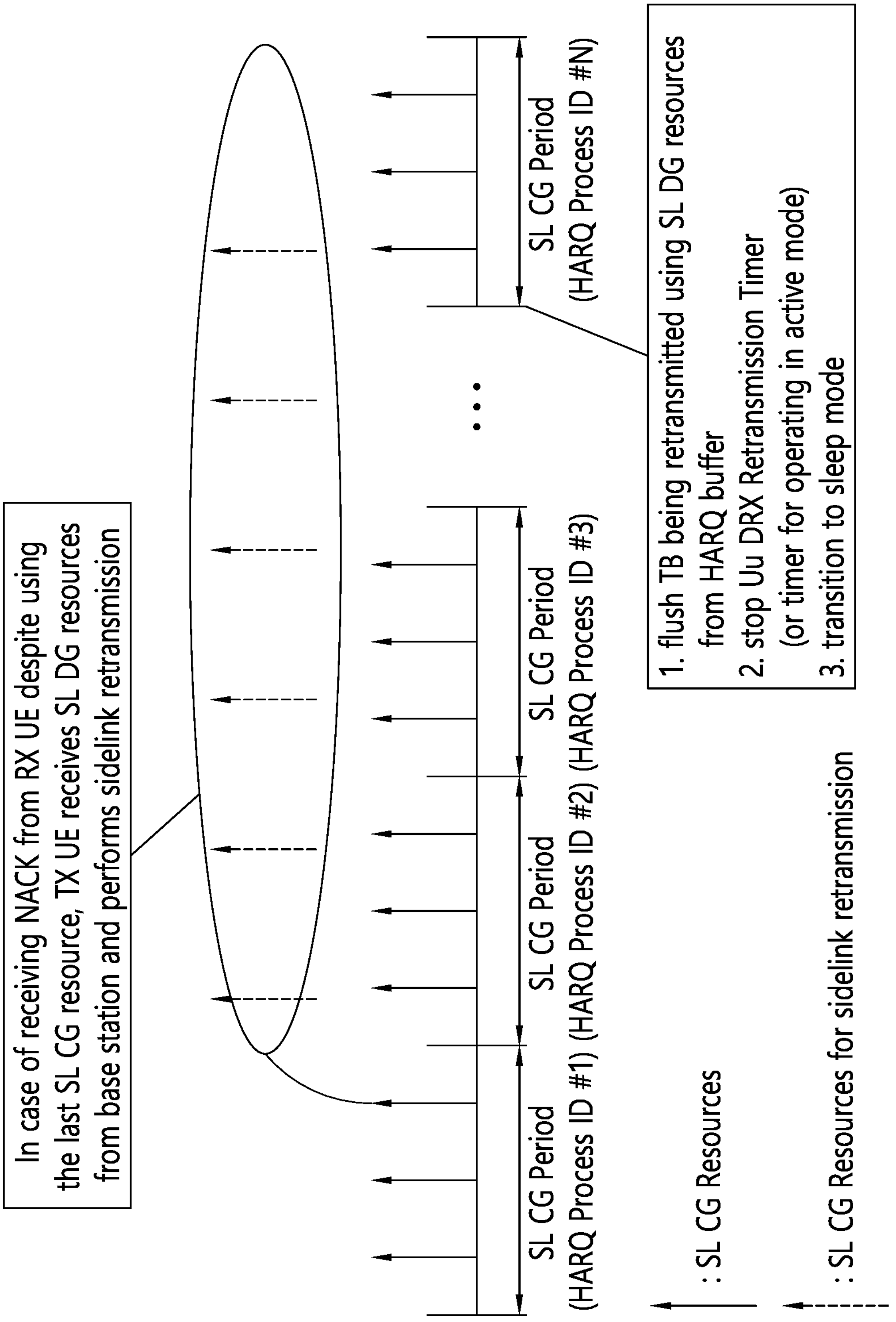
FIG. 9 shows an operation of a Uu DRX timer or an SL DR DRX timer for a sidelink operation, based on an embodiment of the present disclosure.
Figure 10:
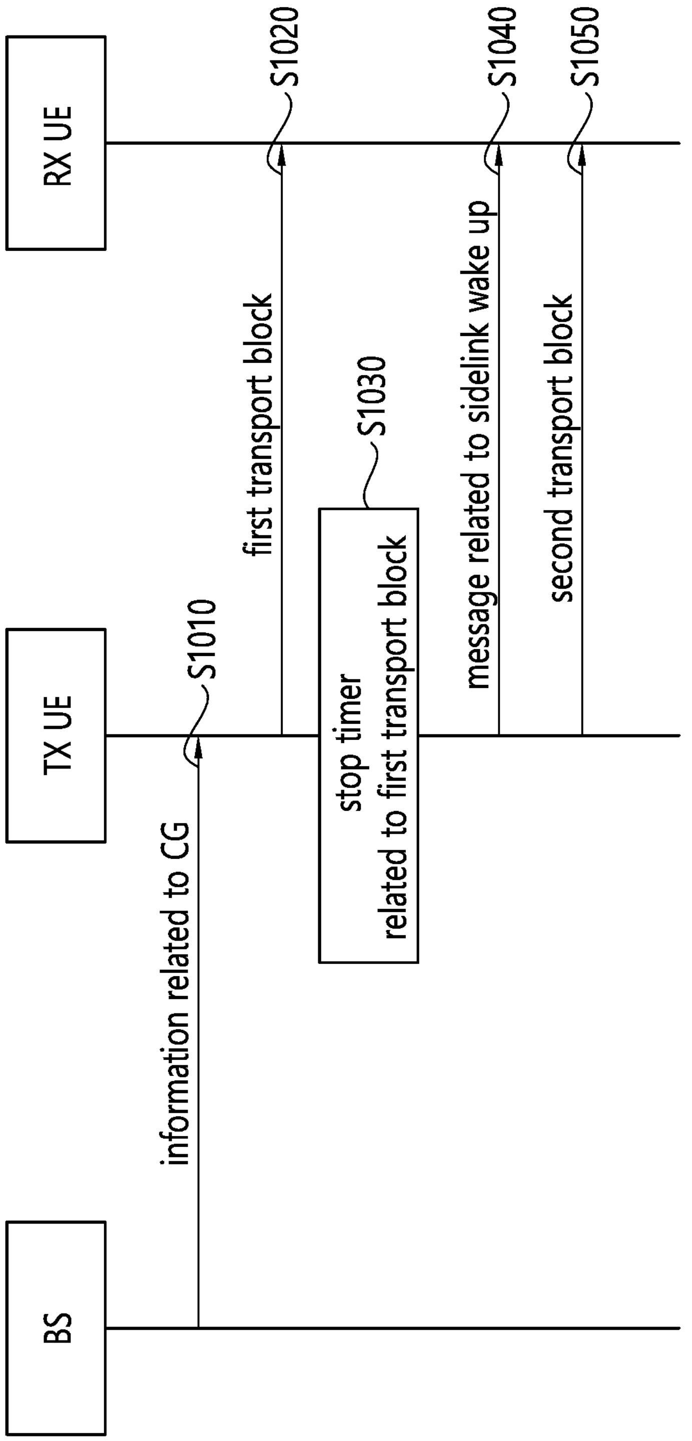
FIG. 10 shows a procedure in which a transmitting UE stops a timer related to a first transport block and transmits a second transport block, based on an embodiment of the present disclosure.
Figure 11:
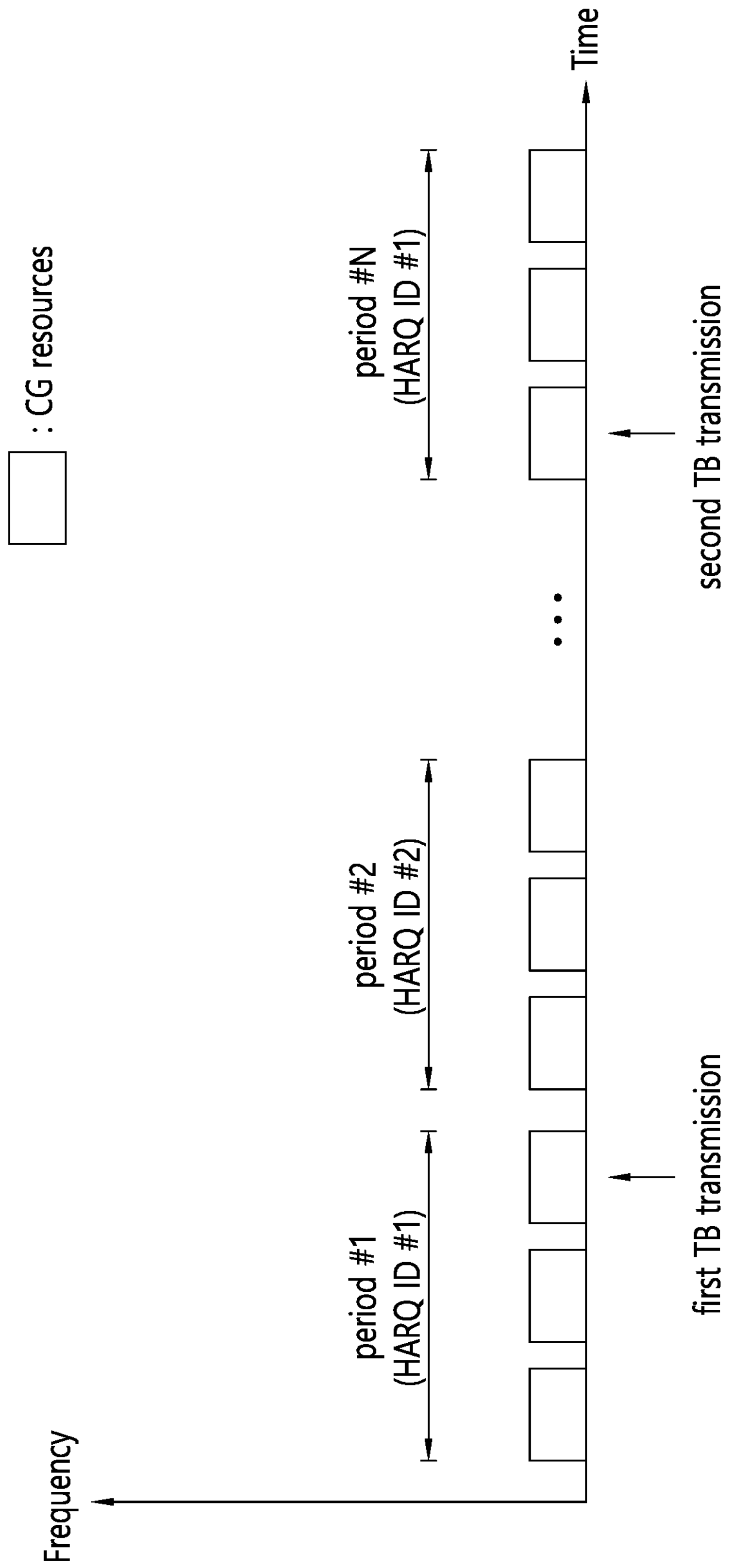
FIG. 11 shows an example in which a transmitting UE stops a timer related to a first transport block and transmits a second transport block, based on an embodiment of the present disclosure.
Figure 12:
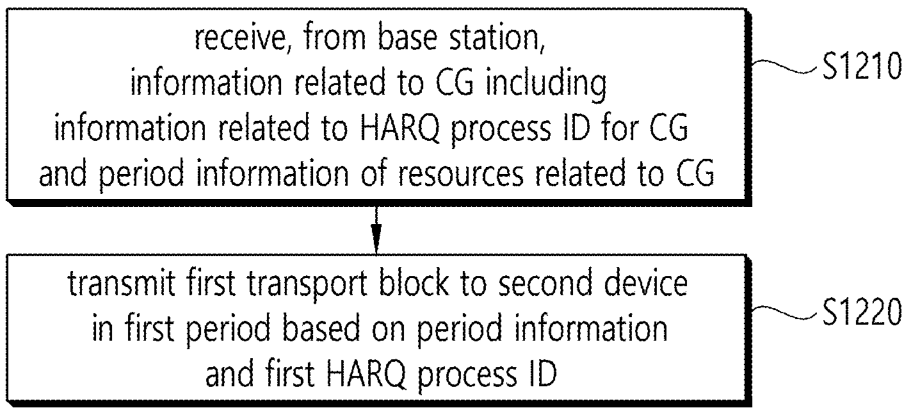
FIG. 12 shows a method for stopping a timer related to a first transport block by a first device, based on an embodiment of the present disclosure.
Figure 13:
FIG. 13 shows a method for receiving, by a second device, a second transport block from a first device, based on an embodiment of the present disclosure.
Figure 14:
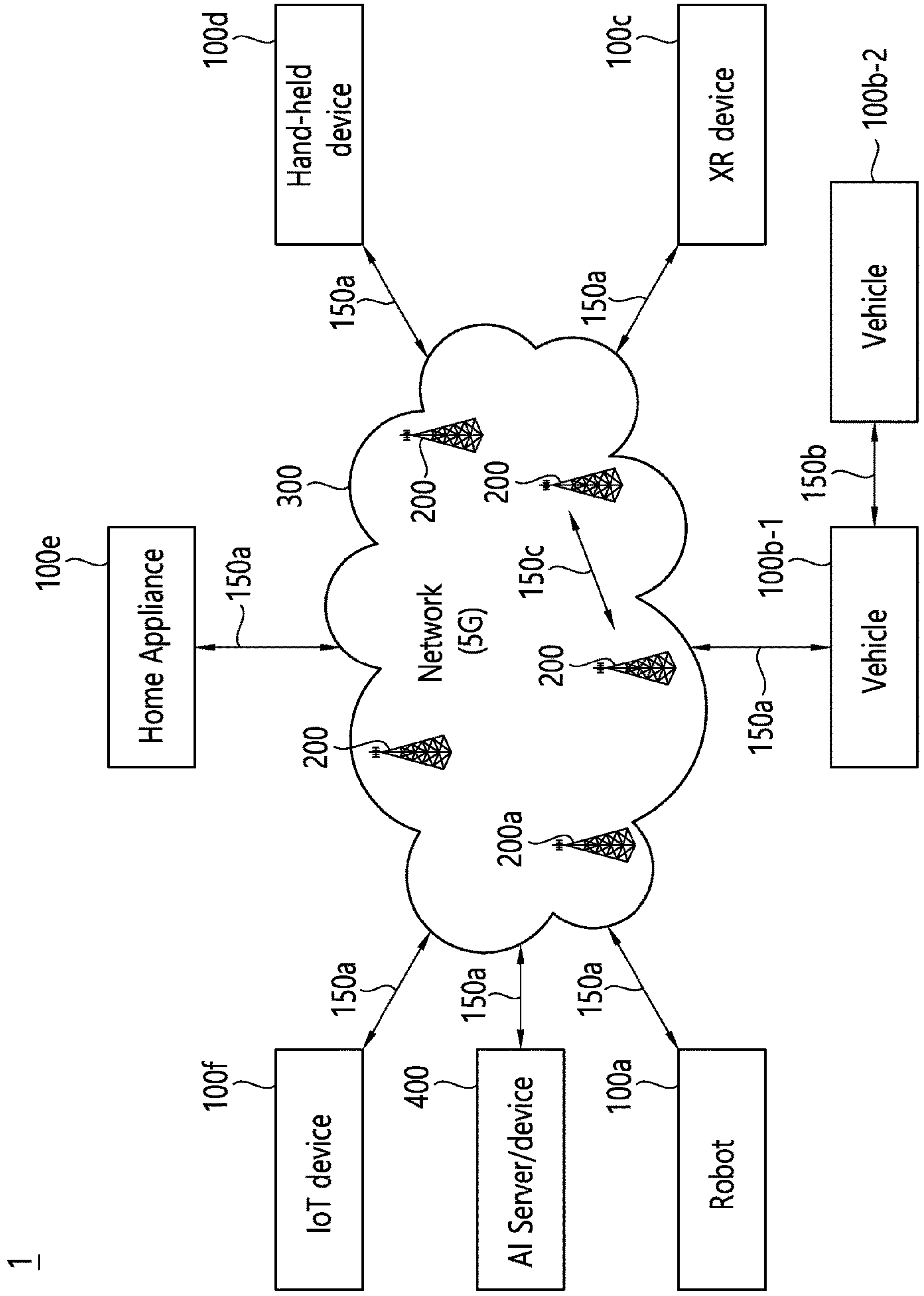
FIG. 14 shows a communication system 1, based on an embodiment of the present disclosure.
Figure 15:
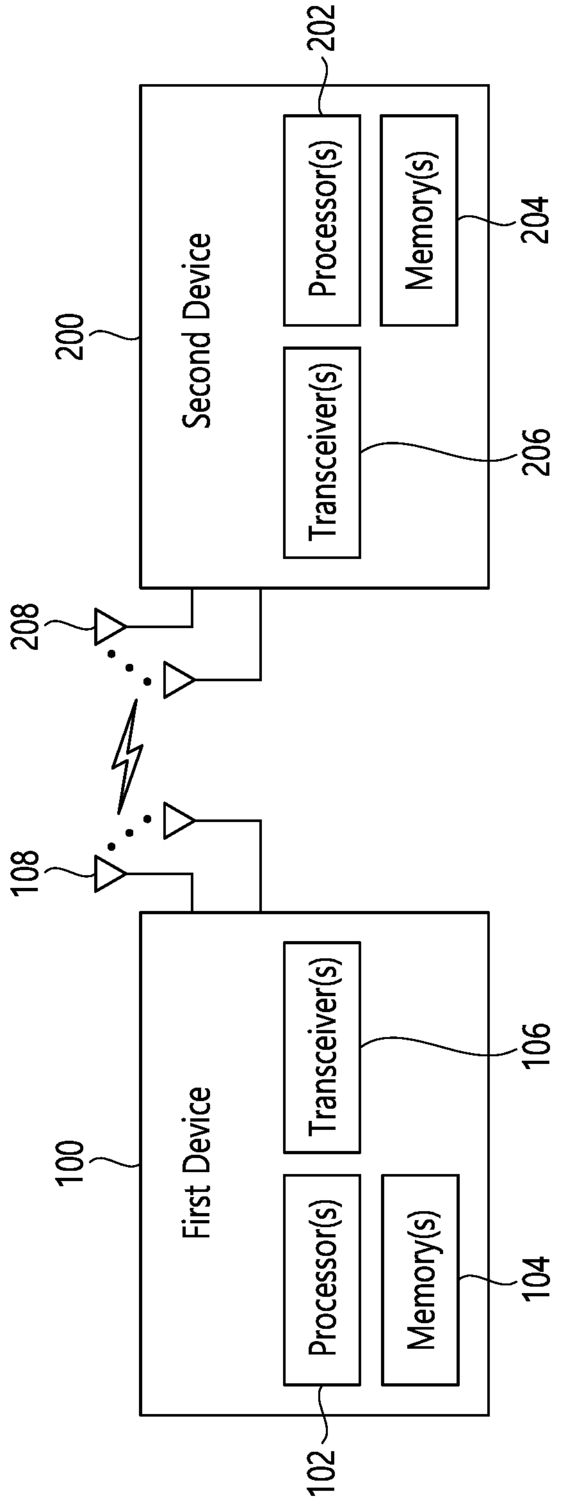
FIG. 15 shows wireless devices, based on an embodiment of the present disclosure.
Figure 16:
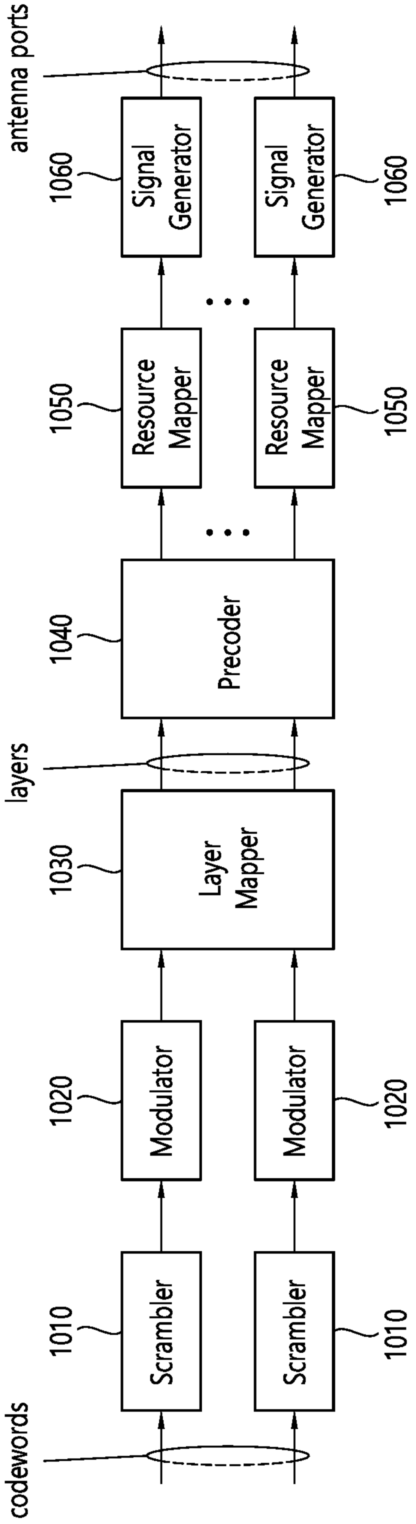
FIG. 16 shows a signal process circuit for a transmission signal, based on an embodiment of the present disclosure.
Figure 17:
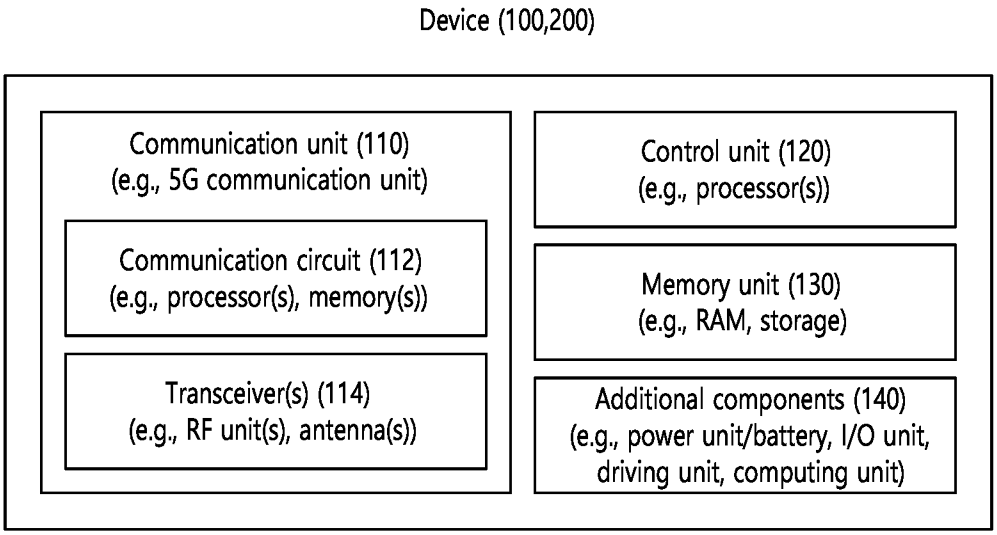
FIG. 17 shows another example of a wireless device, based on an embodiment of the present disclosure.
Figure 18:
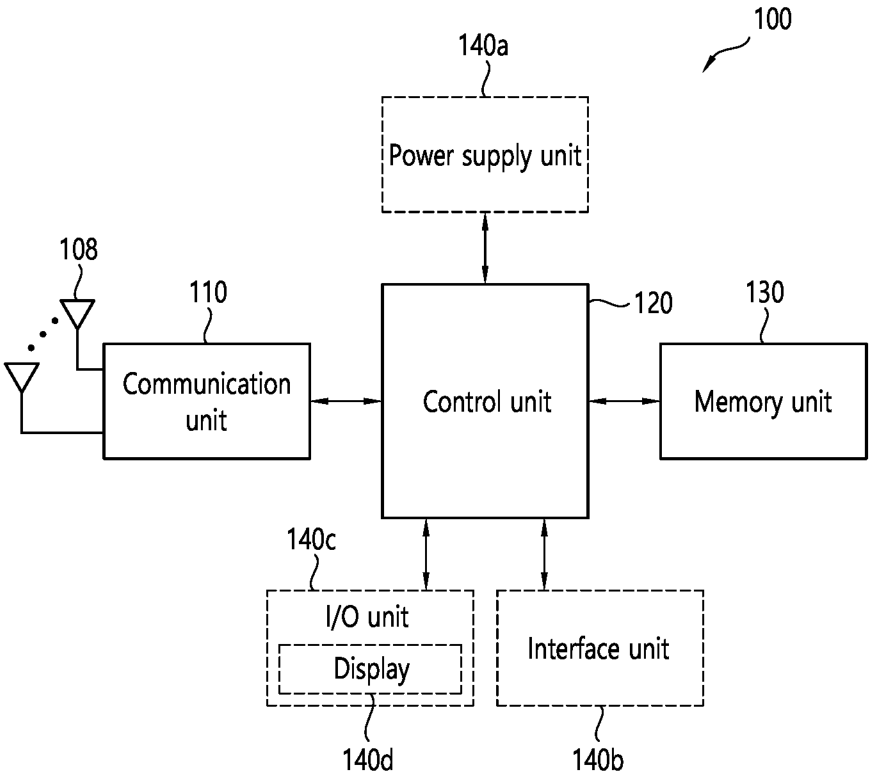
FIG. 18 shows a hand-held device, based on an embodiment of the present disclosure.
Figure 19:
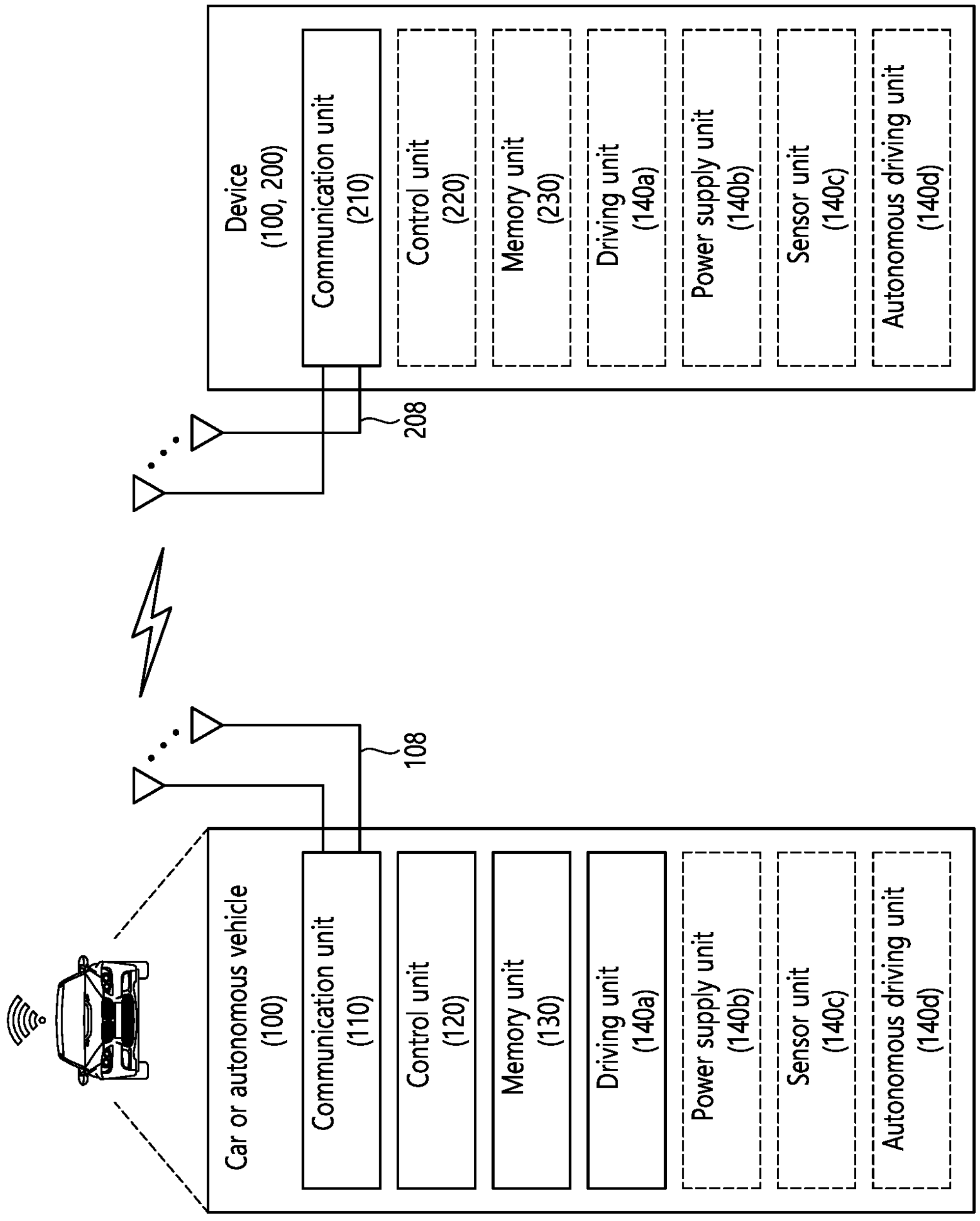
FIG. 19 shows a vehicle or an autonomous vehicle, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

What is claimed is:

1. A method comprising:

receiving, by a first device from a base station, period information related to configured grant (CG);

determining, by the first device, a first hybrid automatic repeat request (HARQ) process ID for a first period, based on a modulo function with a value obtained based on dividing time information of a first resource within the first period by a periodicity of the CG as dividend and a maximum number of HARQ processes as a divisor;

transmitting, by the first device to a second device, a first transport block in the first period, based on the first HARQ process ID;

starting, by the first device, a discontinuous reception (DRX) timer related to the first transport block; and determining, by the first device, a second HARQ process ID for a second period, based on a modulo function with a value obtained based on dividing time information of a second resource within the second period by the periodicity as dividend and the maximum number of HARQ processes as a divisor, wherein, based on that (i) the transmission of the first transport block is failed and (ii) the second HARQ process ID is equal to the first HARQ process ID, the DRX timer related to the first transport block is stopped in the second period, and wherein the second period is a period in which a second transport block is transmitted.

2. The method of claim 1, wherein the DRX timer related to the first transport block includes a HARQ round-trip time (RTT) timer related to Uu DRX between the first device and the base station or a HARQ DRX retransmission timer related to Uu DRX between the first device and the base station.

3. The method of claim 1, wherein the DRX timer related to the first transport block includes an inter-user equipment (UE) DRX RTT timer between the first device and the second device, an inter-UE DRX retransmission timer between the first device and the second device, or an inter-UE DRX inactivity timer between the first device and the second device.

4. The method of claim 1, wherein, based on that (i) the transmission of the first transport block is failed and (ii) the second HARQ process ID is equal to the first HARQ process ID, a message related to an inter-UE link wake up is transmitted to the second device in the second period.

5. The method of claim 4, wherein the message related to the inter-UE link wake up is transmitted through layer 1 (L1) signaling, a medium access control (MAC) control element (CE), or a PC5 radio resource control (RRC) message.

6. The method of claim 4, wherein, based on the message related to the inter-UE link wake up, the second device transitions to a sleep mode related to inter-UE DRX for the first device.

7. The method of claim 1, wherein, based on that (i) the transmission of the first transport block is failed and (ii) the second HARQ process ID is equal to the first HARQ process ID, a HARQ buffer related to the first transport block is flushed in the second period.

8. The method of claim 7, wherein, based on the flushing of the HARQ buffer, a message informing that retransmission of the first transport block is not performed is transmitted to the second device.

9. The method of claim 8, wherein the message informing that retransmission of the first transport block is not performed is transmitted through inter-UE control information, a MAC CE, or a PC5 RRC message.

10. The method of claim 9, wherein, based on the message informing that retransmission of the first transport block is not performed, the second device transitions to a sleep mode related to an inter-UE DRX for the first device.

11. The method of claim 1, wherein, based on the failure of the transmission of the first transport block, a resource for retransmitting the first transport block is allocated from the base station to the first device, wherein the first HARQ process ID is related to the resource for retransmitting the first transport block.

12. The method of claim 1, wherein, based on that (i) the transmission of the first transport block is failed and (ii) the second HARQ process ID is equal to the first HARQ process ID, the second transport block is transmitted in the second period.

13. A first device comprising:

at least one transceiver;

at least one processor; and at least one memory connected to the at least one processor and storing instructions that, based on being executed, cause the at least one processor to perform operations comprising:

receiving, from a base station, period information related to configured grant (CG);

determining a first hybrid automatic repeat request (HARQ) process ID for a first period, based on a modulo function with a value obtained based on dividing time information of a first resource within the first period by a periodicity of the CG as dividend and a maximum number of HARQ processes as a divisor;

transmitting, to a second device, a first transport block in the first period, based on the first HARQ process ID;

starting a discontinuous reception (DRX) timer related to the first transport block; and determining a second HARQ process ID for a second period, based on a modulo function with a value obtained based on dividing time information of a second resource within the second period by the periodicity as dividend and the maximum number of HARQ processes as a divisor, wherein, based on that (i) the transmission of the first transport block is failed and (ii) the second HARQ process ID is equal to the first HARQ process ID, the DRX timer related to the first transport block is stopped in the second period, and wherein the second period is a period in which a second transport block is transmitted.

14. The first device of claim 13, wherein the DRX timer related to the first transport block includes a HARQ round-trip time (RTT) timer related to Uu DRX between the first device and the base station or a HARQ DRX retransmission timer related to Uu DRX between the first device and the base station.

15. The first device of claim 13, wherein the DRX timer related to the first transport block includes an inter-user equipment (UE) DRX RTT timer between the first device and the second device, an inter-UE DRX retransmission timer between the first device and the second device, or an inter-UE DRX inactivity timer between the first device and the second device.

16. The first device of claim 13, wherein, based on that the transmission of the first transport block is failed and the second HARQ process ID is equal to the first HARQ process ID, a message related to an inter-UE link wake up is transmitted to the second device in the second period.

17. The first device of claim 16, wherein the message related to the inter-UE link wake up is transmitted through layer 1 (L1) signaling, a medium access control (MAC) control element (CE), or a PC5 radio resource control (RRC) message.

18. The first device of claim 16, wherein, based on the message related to the inter-UE link wake up, the second device transitions to a sleep mode related to an inter-UE DRX for the first device.

19. A processing device comprising:

at least one processor; and at least one memory connected to the at least one processor and storing instructions that, based on being executed, cause the at least one processor to perform operations comprising:

receiving, from a base station, period information related to configured grant (CG);

determining a first hybrid automatic repeat request (HARQ) process ID for a first period, based on a modulo function with a value obtained based on dividing time information of a first resource within the first period by a periodicity of the CG as dividend and a maximum number of HARQ processes as a divisor;

transmitting, to a second device, a first transport block in the first period, based on the first HARQ process ID;

starting a discontinuous reception (DRX) timer related to the first transport block; and determining a second HARQ process ID for a second period, based on a modulo function with a value obtained based on dividing time information of a second resource within the second period by the periodicity as dividend and the maximum number of HARQ processes as a divisor, wherein, based on that (i) the transmission of the first transport block is failed and (ii) the second HARQ process ID is equal to the first HARQ process ID, the DRX timer related to the first transport block is stopped in the second period, and wherein the second period is a period in which a second transport block is transmitted.

* * * * *